US008040595B2

(12) United States Patent
Gerchberg

(10) Patent No.: US 8,040,595 B2
(45) Date of Patent: Oct. 18, 2011

(54) LIGHT MICROSCOPE WITH NOVEL DIGITAL METHOD TO ACHIEVE SUPER-RESOLUTION

(75) Inventor: Ralph W. Gerchberg, Ardsley, NY (US); Louise Gerchberg, legal representative, Ardsley, NY (US)

(73) Assignee: Wavefront Analysis, Inc., Ardsley, NY (US)

( * ) Notice: Subject to any disclaimer, the term of this patent is extended or adjusted under 35 U.S.C. 154(b) by 207 days.

(21) Appl. No.: 12/376,890

(22) PCT Filed: Nov. 2, 2007

(86) PCT No.: PCT/US2007/018008
§ 371 (c)(1),
(2), (4) Date: Feb. 9, 2009

(87) PCT Pub. No.: WO2010/050909
PCT Pub. Date: May 6, 2010

(65) Prior Publication Data
US 2011/0032586 A1 Feb. 10, 2011

(51) Int. Cl.
*G02B 21/00* (2006.01)
(52) U.S. Cl. ......................... 359/368; 359/900; 359/558
(58) Field of Classification Search ........................ None
See application file for complete search history.

(56) References Cited

U.S. PATENT DOCUMENTS

| | | | |
|---|---|---|---|
| 4,330,775 A | 5/1982 | Iwamoto | |
| 4,953,188 A | 8/1990 | Siegel | |
| 5,426,521 A | 6/1995 | Chen | |
| 6,005,983 A | 12/1999 | Anderson et al. | |
| 6,222,986 B1 | 4/2001 | Inuiya | |
| 6,289,235 B1 | 9/2001 | Webber | |
| 6,412,087 B1 | 6/2002 | Matsumoto | |
| 6,906,839 B2 | 6/2005 | Gerchberg | |
| 7,646,549 B2 * | 1/2010 | Zalevsky et al. | 359/738 |
| 2006/0043302 A1 | 3/2006 | Prelewitz et al. | |

OTHER PUBLICATIONS

R. W. Gerchberg and W. O. Saxton, "A practical algorithm for the determination of the phase from image and diffraction plane pictures," *Optik* 35, 237-246, 1972.
R.W. Gerchberg, "Super-resolution through error energy reduction," Optica Acta 21(9), pp. 709-720, 1974.
V.Y. Ivanov et al., "Phase retrieval from a set of intensity measurements: theory and experiment," Journal of the Optical Society of America A, Optics and Image Science, vol. 9, No. 9, Sep. 1992.
R.W. Gerchberg, "The lock problem in the Gerchberg-Saxton algorithm for phase retrieval," Optik, vol. 74, No. 3, (1986) pp. 91-93.
Gerchberg, et al., "Phase detemination from image and diffraction plane pictures in the electron microscope," Cavendish Laboratory, Cambridge, England, Optik, vol. 34, No. 3 (1971) pp. 275-284.
Erickson et al., "The Fourier transform of a electron micrograph: effects of defocussing and aberrrations, and implications for the use of underfocus contrast enhancement," Berichte der Bunsen-Gesellschaft, Bd. 74, Nr. 11 (1970).

(Continued)

*Primary Examiner* — Arnel C Lavarias
(74) *Attorney, Agent, or Firm* — Niels Haun; Dann, Dorfman, Herrell & Skillman

(57) ABSTRACT

Methods and apparatus for reconstructing a wave, including interpolation and extrapolation of the phase and amplitude distributions, with application to imaging apparatus, such as microscopes.

7 Claims, 9 Drawing Sheets

OTHER PUBLICATIONS

Cooley, et al., "An algorithm for the machine calculation of complex fourier series," Machine Calcualtio of Complex Fourier Series, Received Aug. 17, 1964, pp. 297-301.

Fienup et al., "Phase-retrieval stagnation problems and solutions," J. Opt. Soc. Am. A, vol. 3, No. 11 (Nov. 1986), pp. 1897-1907.

D. Gabor, "A new microcsope principle," Nature, No. 4098 (May 15, 1948) pp. 777-778.

W.O. Saxton, "Computer techniques for image processing in nelectron microscopy," Advances in Electronics and Electron Physics, Supplement 10, Academic Press pp. 51-52.

Decision of PCT, May 5, 2009.

Petition Under 37 C.F.R. §§ 1.182 and 1.183 Request for Reconsideration and Request for Higher-Level Review, Jul. 1, 2009.

Decision of Charles A. Pearson, Director, Office of PCT Legal Administration, Dec. 4, 2009.

U.S. Receiving Office, Notification Relating to Priority Claim, Form PCT/RO/111, Mar. 15, 2010.

International Bureau of WIPO, Notification Concerning Availability of the Publication of the International Application, Form PCT/IB/311, May 6, 2010.

International Bureau of WIPO, Second and Supplementary Notice Informing the Applicant of the Communication of the International Application (to Designated Offices Which Apply the 30 Month Time Limit Under Article 22(1)), Form PCT/IB/308, May 14, 2010.

International Bureau of WIPO, Notification Concerning Transmittal of International Preliminary Report on Patentability (Chapter 1 of the Patent Cooperation Treaty), Form PCT/IB/326, May 14, 2010.

Petition Under 37 C.F.R. §§ 1.182 and 1.183. with Exhibits A-D. Feb. 18, 2008.

Decision of PCT, Aug. 20, 2008.

Request for Reconsideration, Oct. 17, 2008.

Decision of PCT, Nov. 21, 2008.

Request for Reconsideration. Jan. 21, 2009.

R.W. Gerchberg. "A new approach to phase retrieval of a wave front," Journal of Modern Optics, vol. 49, No. 7, 1185-1196, 2002.

* cited by examiner

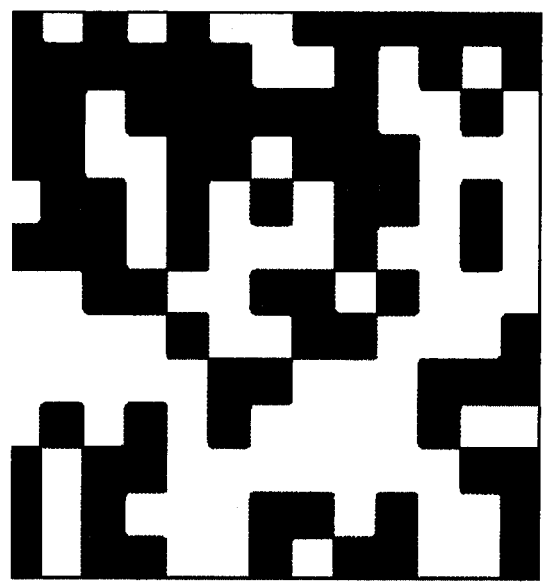
Fig. 4
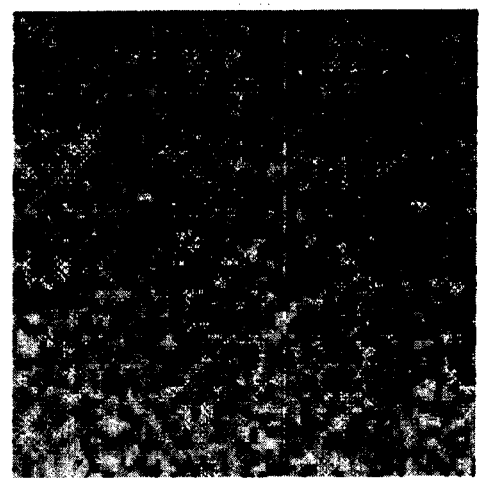
Fig. 5
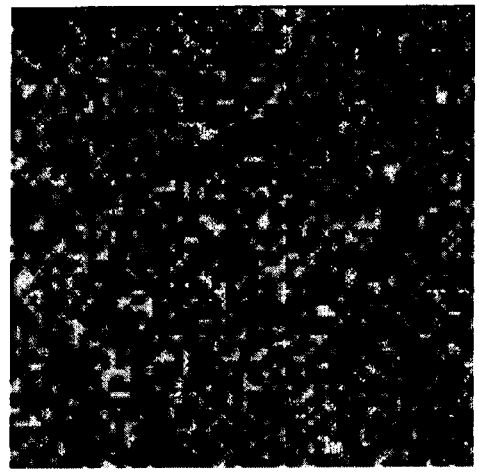
PRIOR ART

LIGHT MICROSCOPE WITH NOVEL DIGITAL METHOD TO ACHIEVE SUPER-RESOLUTION

BACKGROUND OF THE INVENTION

The most simple and therefore the most inclusive description of the method that I have discovered to achieve both phase and amplitude reconstruction along with super resolution is based primarily on three mainstays: the Rayleigh-Sommerfeld scalar wave diffraction equation, the mathematical law of Parseval and the principle of reconstruction through "iterative error reduction" (Gerchberg, R. W. and Saxton, W. O., 1972, Optik, 35, 237).

Physically, the problem involves a three dimensional instrument having transverse Cartesian coordinates X & Y and an orthogonal Z coordinate along the direction of propagation of the wave front of the scattered radiation. I define two conjugate transverse planes at $X_o$, $Y_o$ and $X_d$, $Y_d$. The subscripted o (output) plane is upstream of the subscripted d (diffraction) plane with the scattered wave front propagating from output to diffraction plane along the Z axis. To meet the strict requirements of the scalar diffraction equation, the wave front is considered to be null or zero at the output plane except within a moderately small hole say at the origin ($X_o=0, Y_o=0$). Still more physically, the output plane is a total occluding surface not allowing the scattered wave to exist in that plane at any point that is not within the area of the small hole. The diffraction plane is downstream from the output plane by a distance $Z_d$ sufficiently large so that the two dimensional wave front there can be expressed as the two dimensional Fourier transform of that same wave front at the output plane upstream. Each point within the volume of space between the two conjugate planes can be located by its unique X, Y and Z coordinates. The wave function at each point has a complex value consisting of two rather than one number. The two numbers are called the amplitude and the phase. In sum then, one has a two dimensional amplitude distribution and a two dimensional phase distribution describing the scalar output wave everywhere in the space from $Z_o$ to $Z_d$, and in particular in the output plane. This wave propagates to the diffraction plane at $Z_d$. The distribution in the diffraction plane of the amplitude and phase and therefore of the scattered wave is very different from what it was in the output plane. Mathematically the scattered wave in the output plane has been morphed into a new scattered wave in the diffraction plane by having traveled the distance $Z_d$ between the two planes. The output wave has been Fourier transformed to yield the new diffracted wave. Now the essence of the first problem, the Fourier inverse problem becomes clear.

Ordinarily, the Fourier Transform would take the complete (two dimensional complex) wave form in the output plane and transform it to the complete wave form in the diffraction plane. But current technology can only provide a way to measure the amplitude distribution (without the phase distribution) in the diffraction plane easily and with considerably more difficulty, the amplitude distribution (without the phase distribution) in the output plane. The phase information is not measurable and hence the scattered wave has lost a large percentage of the information it carries. Some estimate as much as 80% of the information in the scattered wave is lost here. However, assuming that we know the amplitude distribution alone in both planes, it is possible via the Gerchberg-Saxton (Gerchberg, R. W., 1974, Optica Acta, v. 21, n. 9, 709) algorithm to infer the complete wave function in most cases. Now, assuming that we have the more likely situation, in which only the amplitude distribution is in hand for the diffraction plane, the phase distribution is again able to be calculated by knowing certain other constraints which exist naturally or which have been artificially placed on the wave function in the conjugate output plane. One of these useful constraints might be the boundary of the hole in the occluding screen through which the wave propagates. Mathematically, this boundary defines a so called area of support of the wave function at the output plane. Another constraint might place a known range of values, within which the amplitude and/or the wave phase must be. In fact, the investigator may make his own set of constraints by placing various phase plates (or partially occluding plates) whose specifications are known, within the area of support, and measuring the different diffracted wave amplitudes (without the phase distribution) corresponding to each perturbing filter. An arrangement such as this was studied by me. The computational algorithm (a modified form of the Gerchberg-Saxton algorithm) is given in "A new approach to phase retrieval of a wave front" by R. W. Gerchberg. (Gerchberg, R. W., 2002, J. of Modern Optics, v. 49, n 7, 1185).

The R. W. Gerchberg article shows that the method is always successful in finding the correct wave function with its phase function in both the output plane and the diffraction plane.

The main thrust of this project was to develop a process including data-gathering and processing techniques that would consistently and without fail discover the phase distribution of a wave front. In the course of the work, new thoughts on data gathering evolved to the point where a novel type of intensity picture bearing little or no resemblance to the wave front or its phase distribution was required for mathematical processing to achieve the phase distribution. For convenience these information images have been dubbed phasorgrams. Phasorgrams are recorded in the diffractive plane or in the image plane of an application device. Additional data, while helpful, are not required, thus eliminating the need for data from two Fourier conjugate planes as in the well-known method of Gerchberg and Saxton. The mathematical processing of these data is carried out by an iterative algorithm which also is new. This algorithm, given good data, has not failed to achieve the phase distribution. Contemporary devices have not been designed to measure the new kinds of data required for the process. Therefore, several novel devices are suggested. The new process could have major implications for the phase problem of X-ray crystallography.

A scalar wave front may be represented as a two-dimensional complex function. At present, the amplitude of this complex function is routinely measured but the associated phase or angular distribution is not directly retrievable. The problem that this paper addresses is a new method of inferring the phase distribution from the measured amplitude distribution of the wave front. Many computer simulations have been run using the new method. All of these have been easily successful in discovering the phase distribution The diffraction theory of Huygens, Young, Fresnel, Kirchhoff, Rayleigh and Sommerfeld referred to in Chapter 3 of Goodman's [1] book provides the basis of the method. Using the paraxial approximation and the restrictions of Fresnel diffraction, Goodman shows that the initial wave front at $z=z_i$ which is propagated along the z axis (normal to the wave front), is related to the observed wave front downstream of at $z_i$, at $z=z_o$, by the equation $$U(x_0, y_0) = \qquad (1)$$

-continued $$\frac{1}{jz\lambda}\exp(jkz)\exp\left[\frac{(jk)(x_o^2+y_o^2)}{2z}\right]\int\int U(x_i,y_i)\exp\left[\frac{(jk)(x_i^2+y_i^2)}{2z}\right]\times$$
$$\exp\left[\frac{(-j2\pi)(x_0 x_i+y_0 y_i)}{z\lambda}\right]dx_i dy_i \quad 5$$

where U(x, y) is the total complex wavefunction in the (x, y) plane normal to the z axis, z is the drift distance between the initial wave front and the observed wave front (i.e. $z=z_o-z_i$), λ is the wavelength, the subscript i indicates quantities in the initial wave plane, the subscript o indicates quantities in the observed wave plane and k is the free-space wavenumber in radians per wavelength.

An eminently readable derivation of this diffraction equation (1), and the paraxial and Fresnel diffraction constraints is given in Chapters III and IV of Goodmans book. Equation (1) is the keystone of this entire project. It validates the notion that, assuming full knowledge of a scalar wave front (a two-dimensional complex function of Cartesian coordinates x and y in a plane normal to the z direction of propagation), it is possible to calculate the two-dimensional complex wavefunction at any drift distance downstream. Thus it is possible to pose an inverse question: given only the measured intensity of a coherent monochromatic wave front in an observation plane at coordinate $z_o$ along the direction of wave propagation, is it possible to determine the wave front completely (both the amplitude and the phase) at the initial coordinate $z_i$ upstream from $z_o$?

Equation (1) shows that the wave front at $z_o$ is related to the wave front at $z_i$ in a fairly simple way. First, there is a constant factor exp (jkz)/jλz, which is determined by the wavelength and the drift distance between the initial and observation planes. Then there is a quadratic phase factor exp $[(jk)(x_o^2+y_o^2)/2z]$, which is a function of the wavelength and the lateral position in the observation plane. We note that the phase functions in both of these factors are not visible to current measuring equipment so that the effect of both factors is simply a magnification constant of 1/λz. What is measurable is the amplitude of the Fourier transform of a complex function in the initial plane which may be referred back to the actual complex wave front in the initial plane in a simple manner. The original question then simplifies to the following: given the amplitude distribution of the complex wave front in the observation plane, can one generate its phase function and thereby provide the information to reconstruct the actual wavefunction in the initial plane uniquely?

The answer of course is no. There is just not enough information to solve this inverse problem uniquely. More information is needed.

Many real situations provide the possibility of acquiring additional independent information. This is true because both the initial and the observation planes are available for experimentation. One may measure wave intensity in either or both of the Fourier conjugate planes and one may alter the wave in either of these planes by using well-defined devices or perturbers in them such as lenses, stops or kinoform lenses. By way of example, in an ordinary light camera with a single convex lens, the relationship between the wave front in the back focal plane (the initial plane) and the image plane (the observation plane) is that of Equation (1) with coherent monochromatic light. Again equation (1) would seem to hold for the wave leaving the face of a crystal and its diffraction pattern. These are only two of the many situations in which equation (1) applies and in which both the initial and the observation planes are available for gathering data and for experimentation. Gerchberg and Saxton (GS) [2] took advantage of this possibility by measuring not only the intensity of the wave in the image plane (observation plane) but also the intensity of the wave in the Fourier plane (initial plane) in the electron microscope. The result provided an answer for discovering the complete wave front, both the amplitude and the phase, in a few but not all cases. Kim [3] very recently published a paper in which the initial plane has been partially obscured in order to generate a new synthetic diffraction plane image. These data are used in a GS-type algorithm to solve partially the phase retrieval problem, and then the result is used as a first estimate to improve further the answer using a second diffraction pattern resulting from an unobscured initial plane. In Kim's simulation, he knows that the initial wave is real as opposed to being complex and that the initial wave is always positive. It is implied that this information is used to help to solve this phase retrieval problem.

Our study also creates synthetic images with which to solve the phase retrieval problem. The initial wave will, however, not be limited to a real function and the perturbation in the initial plane will not be limited to a large region which has been set essentially to zero while retaining the rest of the wave front unperturbed.

This project has, for example, employed kinoform binary phase lenses of very different binary phase distribution patterns which were inserted sequentially into the initial plane to change the phase distribution there, with the result that vastly different observation plane waves, each corresponding to a different initial plane lens, were synthesized. Each lens created a new picture or phasorgram. That particular demonstration used six different kinoform lenses to create the six different phasorgrams which are shown in FIG. 1. The pictures shown there do not resemble the diffraction pattern generated by the unperturbed initial plane wave. That pattern would have been constant across the observation plane. There was no observable detail there. The six different phasorgrams in FIG. 1 plus knowledge of the six binary phase kinoform lenses phase distributions were all that was used to solve that phase retrieval problem.

The new algorithmic process for solving the phase problem mathematically is cyclic. The complex function representing each phasorgram in the image plane is estimated and then these estimates are used to generate a single new estimate of the complex wavefunction in the initial plane. This new initial plane complex function is then used to generate better estimates of the image plane phasorgrams and so on. An index of the goodness of these estimates is the squared difference between the estimated and measured amplitude of each pixel summed over all the phasorgrams. Dividing this number by the sum of the squared measured amplitudes of each pixel over all pixels over all phasorgrams (the defined phasorgrams' energy) gives a normalized index called the fractional error. Note that, the smaller the fractional error, the more the phasorgram estimates look like the measured phasorgrams and presumably the better the complex function estimate resembles the sought function.

FIG. 2 shows the way in which fractional error decreased as a function of iteration number. The curve is monotonic decreasing, which will be shown to be a necessary consequence of the algorithm used to process the data. During the 37 iterations required for this problem, the normalized mean squared error defined in Kim's paper, which is the same as our fractional error except for a constant factor, decreased by four orders of magnitude. FIG. 3 shows contour plots of the way in which the sought phase distribution developed for iterations 1, 10, 20, 30 and 37. The region of support (the area in the plane in which the wave amplitude is not close to zero) in the initial plane was quite small, making it a relatively easy problem to solve. Other details of this simulation are that the field of pictures and kinoform lenses was 64 by 64 pixels for a total of 4096 pixels. The kinoform lenses had phase elements measuring 2 by 1 pixels. Each of these 2 pixel units multiplied the initial plane wave by either 1.0 or −1.0. They were distributed to abutting areas of the kinoform lenses on a coin-toss basis.

A second demonstration solved a more difficult problem in which, once again, the measured unperturbed image was constant. However, the unknown phase distribution was totally random from 0 to $2\pi$ on a pixel-by-pixel basis in a field measuring 64 by 64 pixels. The region of support in both conjugate planes was the entire plane. The sequentially placed perturbing devices in the initial plane were 15 holed stops. The holes in each of the 15 stops measured 5 pixels by 5 pixels. They were distributed in each stop to abutting areas on a coin toss basis. FIG. 4 shows a typical holed stop.

This particular demonstration took 237 iterations to reach a fractional error of less than 1 in $10^4$, providing an essentially perfect phase retrieval. The random nature of the phase in this problem makes it difficult to appreciate the progress of the algorithm. However, the phase distribution estimated after the first and the 225th iteration are shown contoured in FIG. 5. The phase distribution on the 225th iteration is essentially the distribution sought. Note the detail which has been reconstructed. FIG. 6 shows the corresponding curve of fractional error as a function of iterations. It is perhaps worthwhile to compare this curve with that of FIG. 2.

A third demonstration showed the results of using holed stops in an initial plane containing 8 pixel by 8 pixel repeat units in a field of 64 pixels by 64 pixels. The amplitudes and phases of each of the 64 pixels in a repeat unit were chosen at random, the amplitudes between 0 and 2 and the phases between 0 and $2\pi$. The holed stops were designed according to the same random scheme outlined above with the holes being 5 pixels by 5 pixels. The amplitude distribution of this demonstration is shown as FIG. 7 and the new algorithms convergence to a fractional error of less than 1 part in $10^8$ is shown in FIG. 8. This run was obviously planned with crystallography in mind and the result once again was essentially perfect. Nine phasorgrams were used.

Thus, with the new information generated in the observation plane as very distinct pictures or phasorgrams for each known perturbation device placed in the initial plane, it appears that we can solve the phase retrieval problem uniquely. This remark is qualified because although we can and will show that the error must decrease with each iteration or at worst remain the same, no proofs have been devised about uniqueness or stagnation despite the fact that they have not been a problem in dozens of trial simulations. Each of these simulations has been solved using more or fewer phasorgrams with there being no surprises in the reconstructed complex wavefunctions. Stagnation (the error remaining the same from iteration to iteration) has not occurred as long as the number of phasorgrams was sufficient. However, we have yet to devise a rule for deciding the minimum number of phasorgrams required for a given problem. Fienup and Wackerman [4] dealt with the problem of stagnation in many of the variant algorithms of the GS method. It is noted that these algorithms deal with only two pictures.

FIG. 9 is a flow chart of the new algorithm. Its process can be followed by beginning with the N phasorgrams, which are amplitude distributions of complex wavefunctions. One seeks the unique phase distribution which is valid for each of them. To begin, assume that there is no reason to estimate one possible phase distribution over another. Set the phase distribution for all the phasorgrams to zero. Therefore, the first estimate is that they are all real functions. Now Fourier transform each of them and retain the N complex transform functions. If the perturbing device associated with a particular phasorgram was a stop, then all the pixels on each transform that were stopped have their phasors set to zero amplitude. If the perturbing devices were optical lenses or kinoform lenses, then remove the phase effect of the perturber. That is, if the perturber advanced a pixel phasor by 1 rad, then retard that pixel phasor by 1 rad. Carry out the same removal procedure for all the pixels in all the transform functions. Now, on a per pixel basis, add together vectorially the phasors for the same pixel from each of the N transform complex functions (initial wave-front estimates) and average them. Phasors whose amplitude is zero because they were blocked are not considered in the average. Thus, if there were 10 transforms and for a particular pixel, in three of the transforms, that pixel was blocked, then the sum of the remaining seven phasors is divided by seven. This rule does not apply if the perturbers are lenses or kinoforms. There, zero-amplitude phasors are counted as values in the averaging. The resulting single averaged transform is the new estimate of the initial planewave front. Now apply to this wave estimate the effect of each different perturber in turn. Then inverse Fourier transform each of the filtered initial wave estimates and retain them. Each of these new complex functions is an uncorrected estimate of the phasorgram of its respective filter or perturber. Correct this estimate by setting the amplitude of each pixel phasor in each of the new phasorgram estimates to the measured amplitude value while retaining the phase of the estimate. Now the next iteration cycle begins with these new phasorgram estimates.

Note what has been done here. There were N phasorgrams and complete knowledge of the N perturbers which created them. No information was in hand about perhaps the limited support of the initial wavefunction or about whether it was a complex function or not and so on as was the case in the paper by Kim. Instead, this algorithm relied on the principle of error energy reduction exclusively. What is error energy and how is it used here? Its definition and the way that it is used become clear as the processing algorithm is studied. The algorithm begins by estimating the complex function in the plane of observation for each of the N phasorgrams. The phasor for each pixel in all N phasorgrams will have its amplitude set to the measured amplitude and for convenience the phase of each phasor in set to zero. Each of the N phasorgrams is Fourier transformed and the effects of their corresponding perturbers are removed. This yields N different estimates of the complex initial wave. These N estimates must now be combined to yield a single initial wave estimate according to some principle: the error reduction principle. Each initial wave pixel estimate has N or fewer phasor estimates and each of these will be changed to the same phasor estimate for that pixel. That change will require the vector addition to each of these phasor estimates of a different vector to change it to the single final phasor estimate for that pixel. We seek a method of selecting the final phasor estimate in such a way that the sum of the square of the norm of each of the distinct vectors, which are added to each of the N or fewer phasor estimates to yield the final single phasor estimate for the pixel, is a minimum. The sum of this number taken over all the pixels in each of the N initial wave estimates will be called the correction energy. One wants the correction energy to be as small as possible. Accepting this requirement for the moment, the question becomes: how is this minimum correction energy achieved?

Consider a single pixel with its say L phasor estimates. Let E be the total correction energy contribution of this pixel. Then one has the following equation:

$$E = \sum_{i=1 \text{ to } L} (U_i - U_0)^2 + (V_i - V_0)^2, \quad (2)$$

where $(U_i, V_i)$ is the ith phasor estimate's real and imaginary coordinates and $(U_o, V_o)$ is the final phasor estimate's real and imaginary coordinates. Expanding yields $$E = \sum_{i=1 \text{ to } L} U_i^2 - 2U_iU_0 + U_0^2 + V_i^2 - 2V_iV_0 + V_0^2. \quad (3)$$

U and V are independent variables; so solving for each separately yields $$\frac{dE}{dU_0} = \sum_{i=1 \text{ to } L} -2U_i + 2U_0 = 0 \quad (4)$$

or $$\frac{1}{L}\sum_{i=1 \text{ to } L} U_i = U_0; \quad (5)$$

similarly $$\frac{1}{L}\sum_{i=1 \text{ to } L} V_i = V_0. \quad (6)$$

That is, averaging the phasor estimates provides the final phasor estimate that was sought. This procedure only guarantees an extreme but the physical situation is such that there can be no maximum.

Now, in turn each of the perturbers are applied to this estimate and inverse Fourier transformed to yield N new estimates of the N phasorgrams in the observation plane. The perturbers (either optical lenses or kinoform lenses or holed stops) have been chosen to maintain the energy (norm squared) of both the initial uncorrected waveform estimates and the correction functions that were added to them. The linearity of the Fourier transform ensures that the new estimates of the complex phasorgrams will be composed of two parts; the previous iteration estimate plus the transform of the respective correction functions. Furthermore, Parseval's theorem insures that the energy of each of these two parts of a phasorgram estimate will have the same energy as it did in the initial plane. Simply put, Parseval's theorem states that the energies (the integrated squared norm of a complex function) of a function in both of the two conjugate Fourier planes will be the same. One now chooses to make the correction to each pixel phasor in the observation plane which is the smallest possible. Referring to FIG. 10, the Argand diagram shows that by retaining the phase of the new estimate and replacing the phasor amplitude with the known amplitude the new error vector CB, in the observation plane, on a pixel-by-pixel basis will have the same or less energy than the correction energy vector AC from the initial plane. The total error energy over all phasorgrams as the process proceeds through the Fourier transforms and the removal of the perturber effects to the N new estimates of the initial wave front is the upper limit of the total correction energy. That is because the new estimate of the initial wave is the same as the previous estimate of the initial wave plus the transform of the error function that was added in the observation plane. Parseval's theorem ensures that that error function energy is the same in both conjugate planes. Thus, at this point, the algorithm could return to the previous initial wave estimate, causing the correction function energy to equal the error energy and the algorithmic process would stagnate. Neither the correction energy nor the error energy would change. However, by averaging the phasor estimates, one is guaranteed to have the lowest total correction energy possible. In this way, the algorithm proceeds from one conjugate plane to the other reducing the correction energy in the initial plane and then reducing the error energy in the observation plane. The goal of course is to find a phase distribution which makes the error energy or the correction energy zero or as close to zero as possible.

A slightly different situation occurs when there are measurements of the amplitude distribution not only in the observation plane (the phasorgrams) but also in the initial plane. The phasor estimates must be averaged as in the above algorithm and then, retaining the phasor angle, the amplitude of the averaged phasor is adjusted to match that measured. Thus, if the measurement of the amplitude of the wave in the initial plane is in hand, then with this adjustment the algorithm will be much more efficient.

A new method of phase retrieval has been documented. It rests on the diffraction equation of Raleigh and Sommerfeld and also of Kirchhoff, Fresnel and Huygens as simplified by the paraxial approximations and the Fresnel diffraction requirements. This equation is given as equation (1). Simplified, the problem essentially became the following: given the amplitude of a complex two-dimensional function in either or both of its conjugate Fourier domains, is it possible to discover the phase function uniquely and reliably? The answer was no, based on those measurements alone. It was shown, however, that, with experimentation, additional measurements could be made to provide the answer to the phase retrieval problem. For example, in an ordinary camera, the light wave in the back focal plane of the lens shares the diffraction equation (1) relationship with the imaging plane. Both planes are available and by using optical lenses or diverse stops or kinoform lenses in the back focal plane, new pictures (phasorgrams) may be made in the imaging plane. An indefinite number of these phasorgrams plus precise knowledge of the initial plane perturbers (lenses, etc.) that produced them is enough additional information to ensure phase retrieval. Similarly, diffractograms taken from a crystal specimen in which diverse stops were laid against the side of a radiating crystal could be solved.

These data powered a new iterative algorithm to the solution of the phase retrieval problem. The algorithm was elucidated and it was found that its defined error energy must decrease with each iteration or at worst remain the same. It was demonstrated that, when the error was zero or very small, the answer was in hand. However, it still remains to be proved that this necessarily follows. Perturber designs remain to be opitimized and the trade-off between the designs and the number of phasorgrams required to solve the phase retrieval problem needs to be studied. Simulations have been carried out but it still remains actually to build a device that would employ these principles.

REFERENCES

[1] Goodman, J. W., 1968, *Introduction to Fourier Optics* (New York: McGraw-Hill), pp. 30-55.

[2] Gerchberg, R. W., and Saxton, W. O., 1972, *Optik*, 35, 237.
[3] Kim, W., 2001, *Optics Lett.*, 26, 134.
[4] Fienup, J. R., and Wackerman, C. C., 1986, *J. opt. Soc. Am. A*, 3, 1879.

However there is more.

SUMMARY OF THE INVENTION

I have discovered that a modification of the algorithm given in the above-referenced Gerchberg article will not only solve the inverse phase problem, it will also extrapolate and/or interpolate the diffracted wave. This means that if there are doubtful or missed data points in the diffraction plane, the algorithm will generate the complex values that must be there. Moreover, if the diffraction pattern amplitude distribution measured is smaller than the full distribution, the modified algorithm will generate (extrapolate) the values that are missing and in so doing achieve super resolution in the recovered wave function.

BRIEF DESCRIPTION OF THE DRAWINGS

FIG. 4. Typical random hole stop (white areas are holes). Each square abutting the area of a given number of pixels is either stopped or holed on a coin-toss basis.

FIG. 5. Simulation 2 phase evolution at iterations 1 and 225. At iteration 225 the problem is solved. Note the detail in this simulation. From black to white is $2\pi$ rad.

DETAILED DESCRIPTION

Figure 1:
FIG. 1. Six different information images or phasorgrams captured in the image plane in simulation 1. These are produced by six different binary phase kinoform lenses sequentially placed in the initial plane upstream from the image plane.
Figure 1:
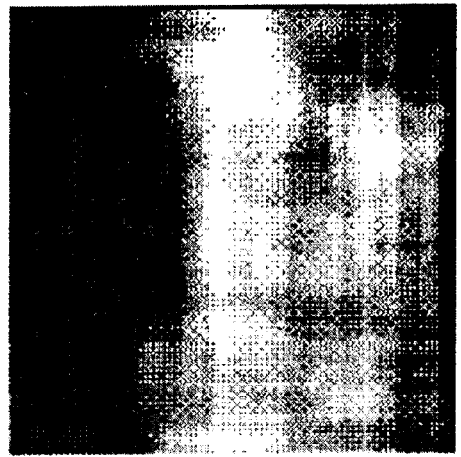
Figure 1:
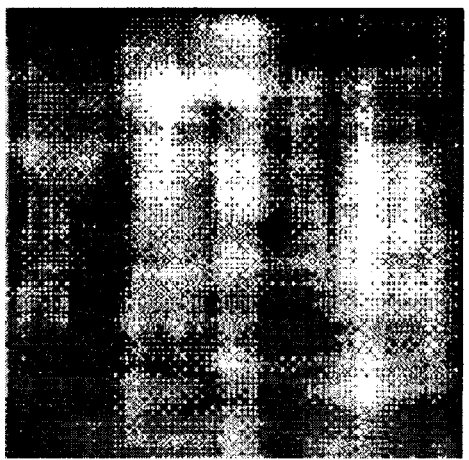
Figure 1:
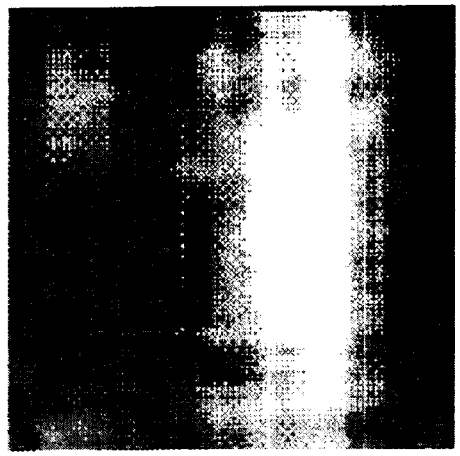
Figure 1:
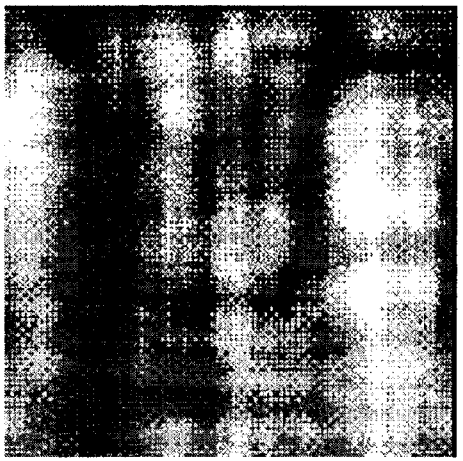
Figure 1:
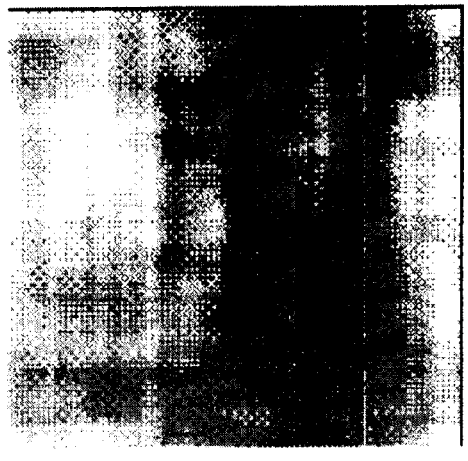
Figure 2:
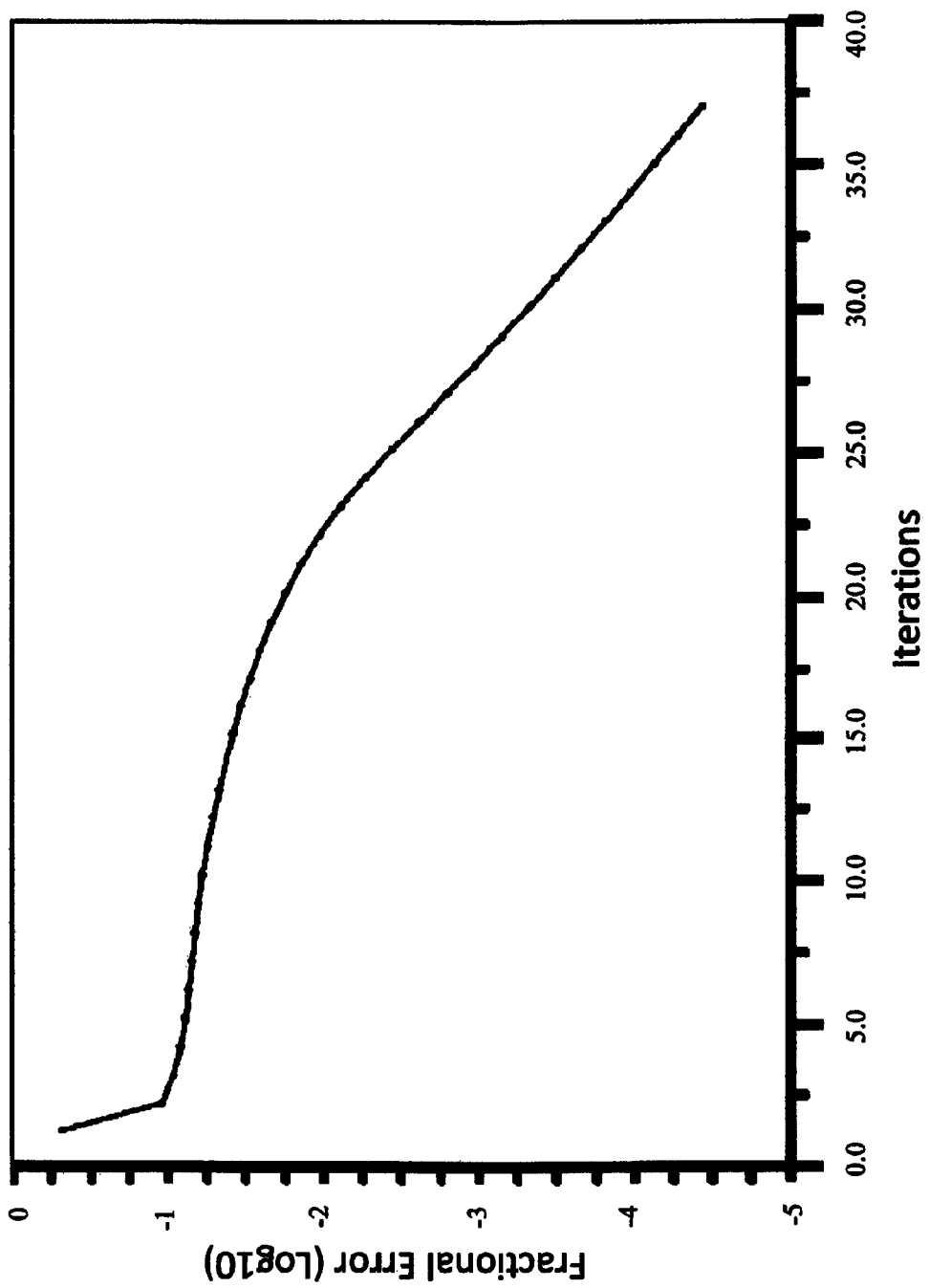
FIG. 2. A semilogarithmic plot of fractional error versus iterations in simulation 1. Fractional error is the total error energy in either Fourier conjugate plane divided by the total phasorgram energy.
Figure 3:
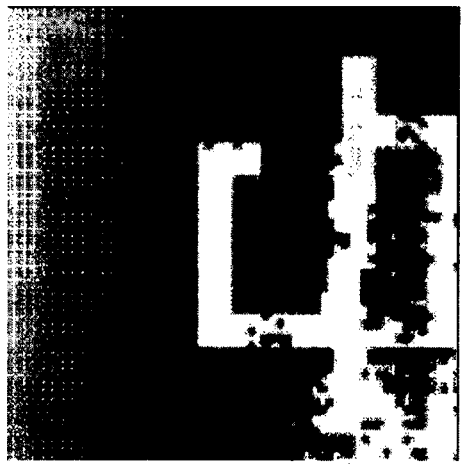
FIG. 3. Phase distribution evolution at iterations 1, 10, 20, 30 and 37 in simulation 1. From black to white is $2\pi$ rad.
Figure 3:
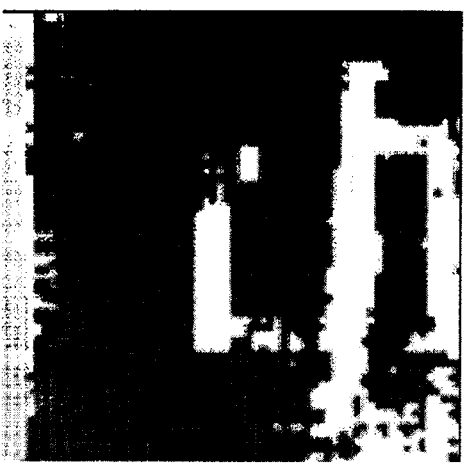
Figure 3:
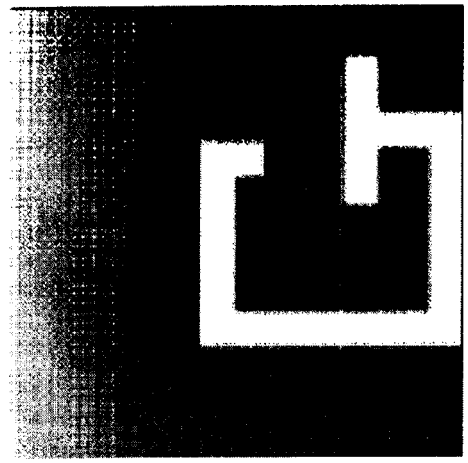
Figure 3:
Figure 3:
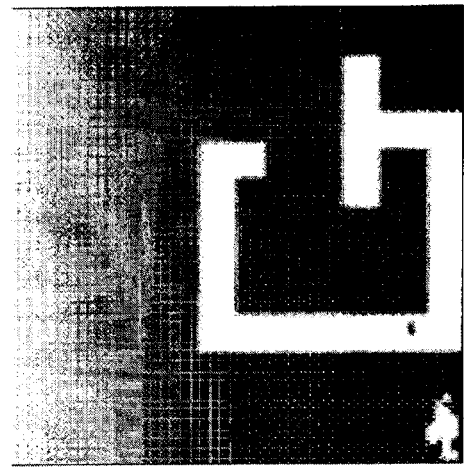
Figure 6:
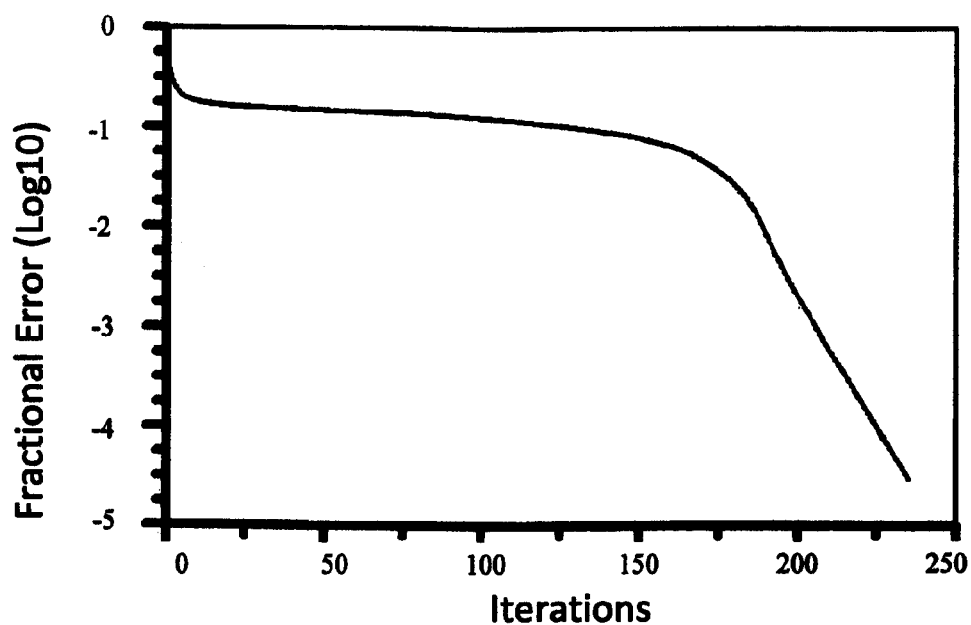
FIG. 6. A semilogarithmic plot of fractional error versus iterations in simulation 2.
Figure 7:
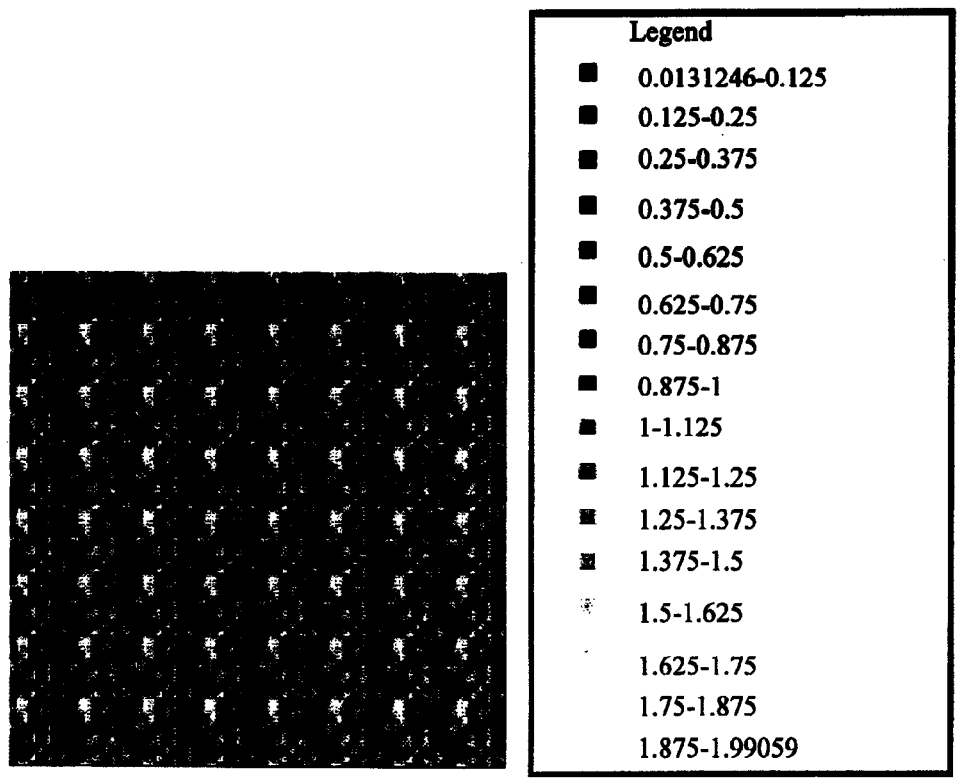
FIG. 7. The amplitude distribution of a simulated crystal. Repeats are 8 pixels by 8 pixels with 0 to $2\pi$ random phase on each simulated molecule pixel.
Figure 8:
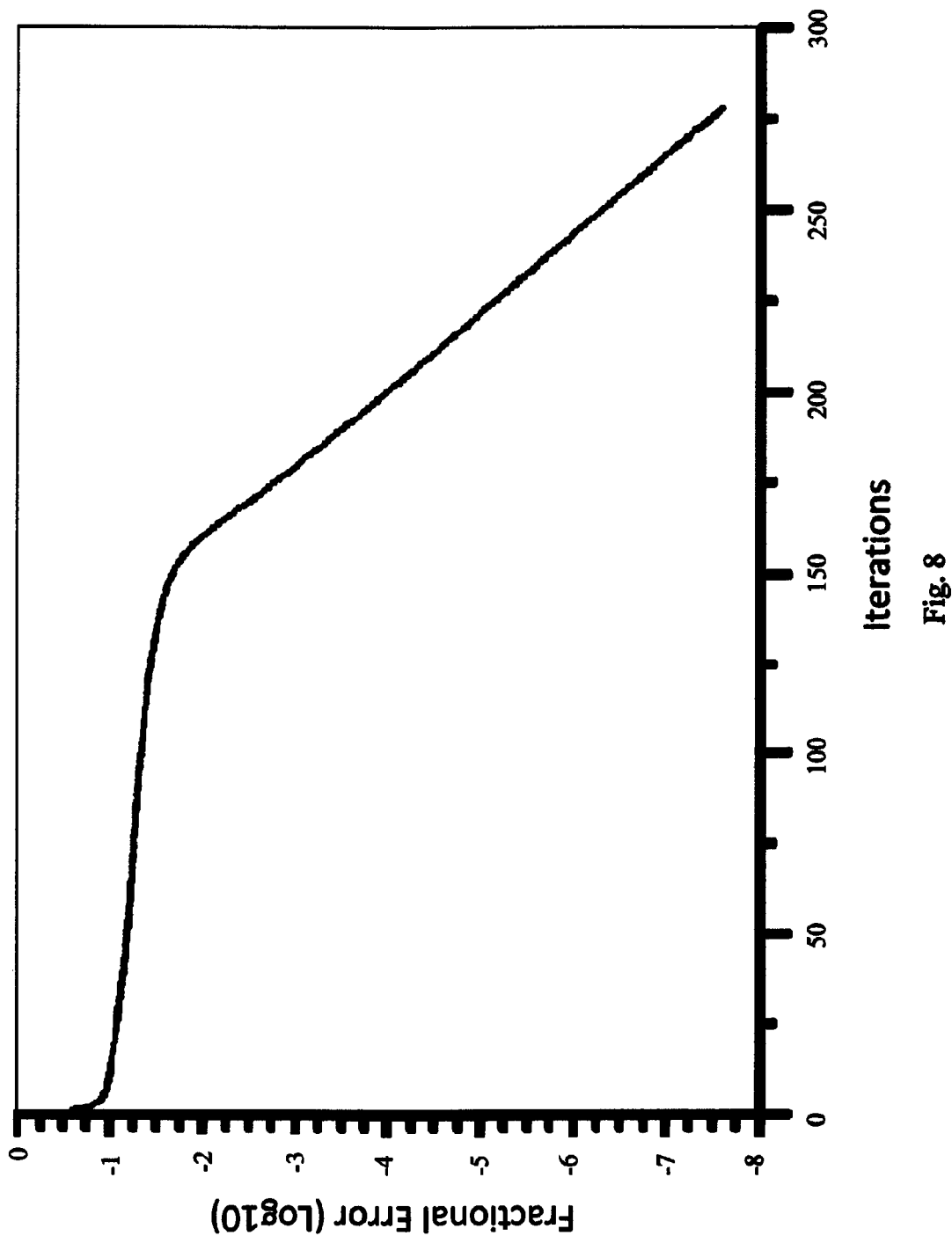
FIG. 8. A semilogarithmic plot of fractional error versus iterations in the crystal simulation.
Figure 9:
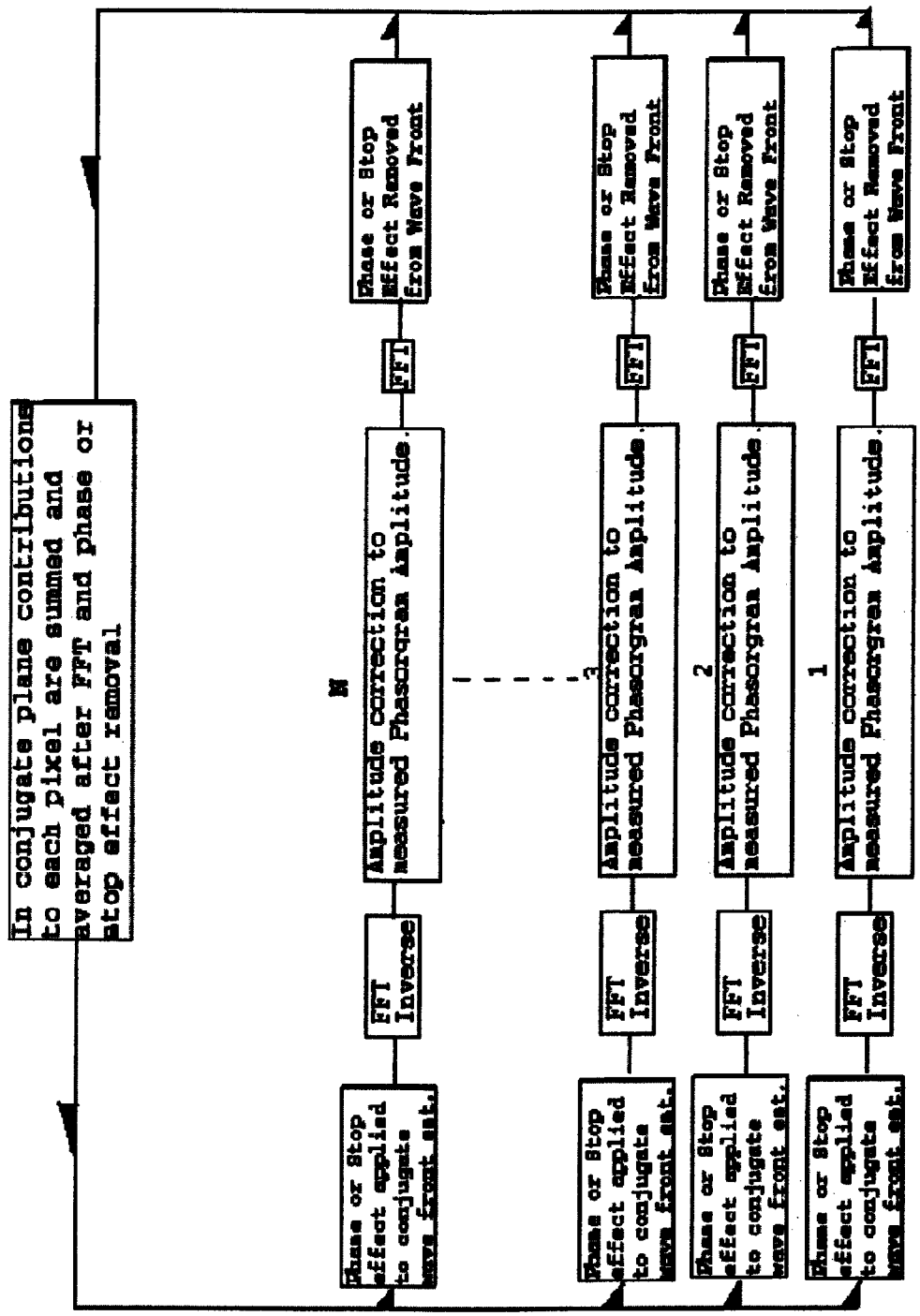
FIG. 9. General flow chart of the new algorithm. There are slight variations for using stops as opposed to lenses as perturbers in the initial plane. FFT, fast Fourier transform.
Figure 10:
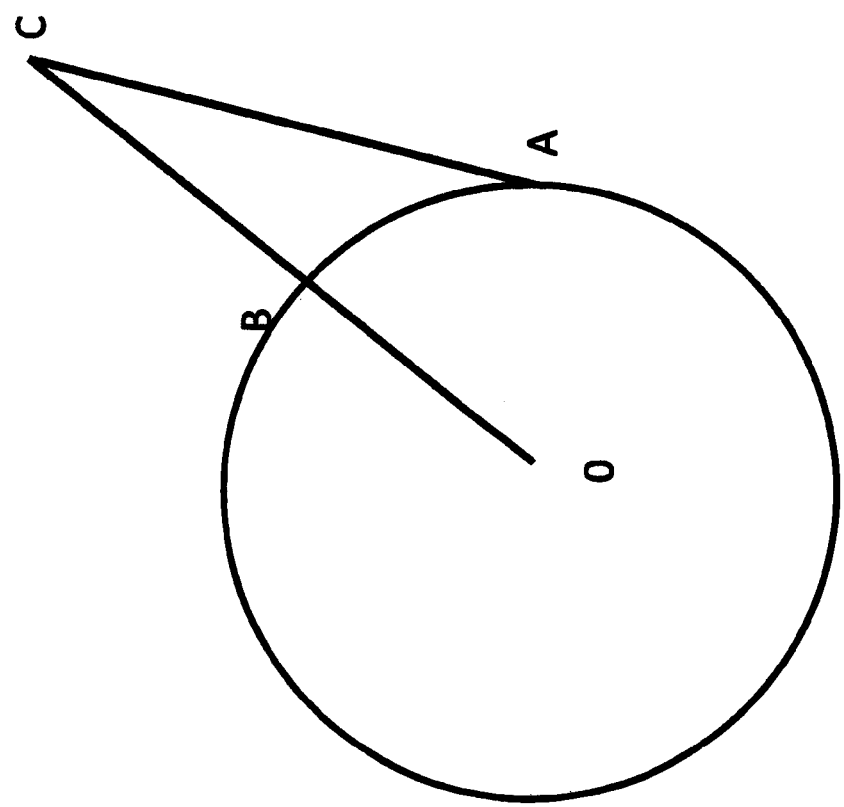
FIG. 10. Argand diagram for a pixel in the observation plane. The circle radius is measured amplitude of the phasor. The previous phasor estimate was OA. OC is the current estimate. OB is the corrected new estimate. BC is smaller than or equal to AC. The sum of the norm squared of AC over all pixels in all phasorgrams equals the total correction energy in the initial plane according to Parseval's rule.

To describe the new algorithm, I begin with the minimum physical essentials for collecting data from a transmission type specimen with a range of illumination absorption and phase change distributed over its extent. This specimen is mounted in a hole in a 2 dimensional occluding plane at $Z_o$ which is located a distance $Z_d$ upstream of the diffraction plane. The size and location of the hole as well as the distance $Z_d$ are known. Illumination of the specimen will be by a coherent, uniform amplitude and phase wave front. Immediately upstream or downstream of the specimen (ideally at the specimen) the wave front phase will be changed by a phase filter so that the wave front at the specimen will be the sum of the unknown specimen amplitude and phase distribution and the known phase filter distribution. The filter phase distribution is known. The filter amplitude distribution is equal to a constant of one. Depending on the problem, there will be several different phase filters that will substitute for each other during the gathering of data about the specimen, as will be shown. Incidentally. different holey occluding filters may be used rather than phase filters, where "holey" filters are light-occluding barriers with known spatially distributed holes of possibly varying size. Combinations of holey filters and phase filters can also be used. The output wave (at the specimen) will propagate along the Z axis to the diffraction plane located at $Z=Z_d$. There the intensity or rather the amplitude distribution of the wave front will be measured for each different phase filter successively. The number of diffraction patterns in hand will equal the number (say, N) of phase filters used. The diffraction patterns will be known. All the data that are necessary are now in hand.

Computer processing all these data is done in an iterative manner. Successive cycles of the algorithm produce better and better estimates of the specimen amplitude and phase distributions. There is the possibility that successive estimates do not change. In this case additional filters will be required to generate additional diffraction patterns. However, the algorithm is guaranteed not to diverge from the correct estimate in a mean squared error sense.

Remember now that the wave function in the diffraction plane is the Fourier transform of the filtered wave function in the specimen plane. For no particular reason let us begin the first iterative algorithm cycle in the diffraction plane corresponding to one particular filter. We have in hand the amplitude distribution of the wave which was measured and we will combine that with the best guess we can make for the phase distribution to yield our first estimate of the complete wave function for that particular filter in the diffraction plane. Put this estimate through an inverse Fourier transform to yield an estimate of the filtered specimen wave. In the computer use an inverse phase filter to cancel the effect of the actual filter. (If an element of the physical filter shifted the phase by say plus 37 degrees, the inverse filter would shift the phase of that element by minus 37 degrees). This yields the first raw estimate of the specimen phase and amplitude distribution. Save this specimen estimate. I usually use two two dimensional matrices each with X & Y indices which cover the output plane. One matrix contains the Real part of the complex numbers which define the specimen wave function at each point on the specimen and the other part contains the Imaginary part. Now do the same procedure with each diffraction plane amplitude distribution adding the Real and Imaginary parts of the wave forms generated into the 2 corresponding Real and Imaginary matrices. Now divide each number in the 2 matrices by the number of diffraction patterns (N) which have been used. Also, since we know that the value of the true specimen wave is zero outside the hole in the occluding screen plane, we can set all values of elements outside the hole to zero. At this point we may be able to incorporate any data that we know about the true specimen wave into the estimated wave function that is contained in the two matrices, always taking care to make the correction as small as possible if there is a range of correction that will satisfy the known a priori constraint. Clearly, at this point our two matrices hold the first estimate of the wave function in the output or specimen plane!! Note that we have taken some number (say N) of recorded diffraction patterns in the diffraction plane to generate just one estimate of the wave function in the output plane before we apply any phase or occluding filters to it. The next step in the algorithm is to generate estimates of the N diffraction patterns that this estimate of the specimen wave function will produce after it has been modified by a phase (or occluding) filter.

I take one of the phase filters and essentially apply it to the estimate of the specimen wave function in the output plane. Then I propagate the wave to the diffraction plane. In the computer, this is done by mathematically Fourier transforming the filtered estimate of the specimen wave function. The diffraction pattern amplitude distribution generated will not match that which was physically measured and corresponded to that filter. So, I replace the diffraction wave amplitude distribution with the measured distribution leaving all points on the wave at which I have no a priori measured data untouched. As the algorithm proceeds these points will assume the value that they must have. The points so developed may be said to be extrapolated or interpolated depending on their location in the diffracted wave. Note that I have not modified the phase distribution of the diffracted wave. Thus the second estimate of the diffracted wave corresponding to the phase filter chosen is in hand and this diffracted wave function is saved. I do the same procedure for the next N−1 remaining filtered output waves yielding a total of N diffracted wave second estimates. These are the new N diffracted wave estimates with which I begin the next cycle of the iterating algorithm.

It is noted here that the computer processing of the data is slightly different if holey perturbing filters are used, rather than phase filters, to generate the different diffraction patterns. In this case, if a return falls on a pixel that is blocked by the holey filter, that return is not counted in the averaging to achieve the estimate of the output specimen.

I define a figure of merit as the sum of the squares of the differences between the diffraction amplitude distributions measured minus those estimated. I call this the error energy for any particular cycle. It will be found that this error energy can not increase and that given sufficient numbers of filtering data, will always decrease approaching a limit of zero. Of course zero error will mean that not only has the phase inverse problem been solved but so too has the extrapolation and interpolation problems been solved in cases where this was required.

Figure 11:
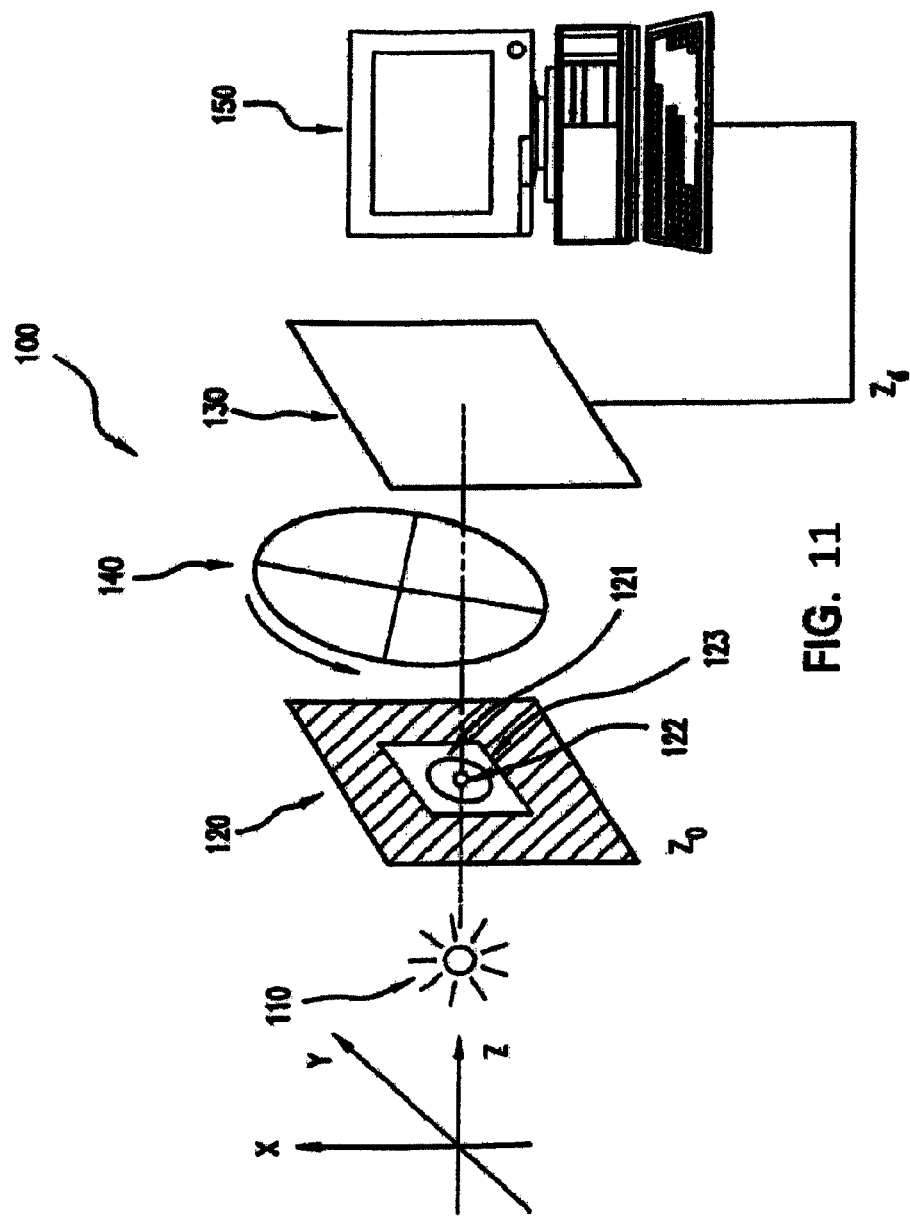
FIG. 11A light microscope comprising a coherent light source; a specimen mounted on a glass slide placed over a hole in an occluding plane located at position $Z_o$ along the Z-axis; a rotating phase filter comprising multiple sectors; a detector located at position $Z_d$ along the Z-axis; and a computer connected to detector 130.

The method just described lends itself to implementation in a number of physical embodiments, which in turn suggest some possibly useful variations of the method. For example, shown in FIG. 11 is a light microscope 100, comprising a coherent light source 110; a specimen 122 mounted on a glass slide 123 placed over a hole 121 in an occluding plane 120 located at position $Z_o$ along the Z-axis; a rotating phase filter 140 comprising multiple sectors, each giving a different phase shift distribution; a detector 130 (for example, a charge-coupled-device detector) located at position $Z_d$ along the Z-axis; and a computer 150 connected to detector 130, the computer 150 being capable of performing digital signal-processing functions, such as two-dimensional Fast Fourier Transforms. The above-described method may be applied to the operation of microscope 100, thereby achieving super-resolution. In order to do this, phase filter 140 is rotated N times, each time interposing a different phase-modifying sector into the path of light propagating from the sample to the diffraction plane. This then generates the N diffraction patterns at detector 130 required as inputs to the algorithm. The algorithm is run as described above, generating not only the phase distribution at the diffraction plane, but also the amplitude and phase distribution at points not measured by detector 130, for example at points beyond the physical extent of detector 130 (extrapolation), and/or at omitted or doubtful points in between those measured by detector 130 (interpolation).

In the apparatus just described, it is helpful if the occluding plane 120 is painted black, and if the hole 121 has well-defined edges, so that the area of support (the area in which the lightwave can exist at the plane $Z_o$) is well-defined. In the figure, hole 121 is shown as substantially circular, but it can have other shapes.

While the figure shows light from source 110 being transmitted through specimen 122, in other variations such an apparatus can work with reflected or scattered light, rather than transmitted light.

Instead of rotating a multi-sector phase filter such as filter 140 through the light path, other techniques can be used to achieve the necessary phase variations to produce the required N diffraction patterns. For example, a mechanism that moves individual phase filters into and out of the light path by translation rather than rotation can be used. Spatial light modulators can be applied to modify the phase by sequentially varying amounts. Also, occluding or partially occluding filters can be used. See FIG. 4 for an example.

The above variations have been based on modifying the phase of the lightwave sequentially in time. However, by the use of optical techniques such as beam splitting, multiple phase-altered copies of the output wave can be produced and applied to multiple detectors in parallel. If the resulting diffraction patterns are then inverse-Fourier-transformed in parallel, a considerable speed-up in the operation of the algorithm can be achieved.

Note that the microscope of FIG. 11 is a lensless microscope. It is thus free of the typical imperfections introduced by defects in lenses, etc. However, the methods and apparatus described herein can also be applied to lens-based systems, such as cameras. What is required in each instance is the identification of a pair of conjugate planes, in the sense that the wave functions at the respective planes are related via the Fourier transform (or, at lesser drift distances, via the Fresnel transform—see eqn. 1). In the case of a camera, suitable conjugate planes are the back focal plane of a camera lens and the image plane. Applications to telescopes are also expressly contemplated.

Much of the above discussion has been in terms of visible light. However, it will be appreciated that the method and apparatus can be applied to phase and amplitude reconstruction of other waves and wave-like phenomena, such as radio waves, X-rays, and electron waves.

The following documents are incorporated in this disclosure by reference, in their entirety.
1. Gerchberg, R. W. and Saxton, W. O., 1972, Optik, 35, 237
2. Gerchberg, R. W., 1974, Optica Acta, v. 21, n. 9, 709
3. Gerchberg, R. W., 2002, J. of Modern Optics, v. 49, n 7, 1185
4. U.S. Pat. No. 6,906,839, issued Jun. 14, 2005, to Ralph W. Gerchberg

We claim:
1. A method for reconstructing a wave, comprising the steps of:

illuminating a specimen at an output plane to provide an output wave comprising specimen information, the output plane including a null region in which the output wave has a value of zero;

applying a number N of different phase filters of known phase shift to the output wave at or near the output plane to create N phase-shifted waves each having a phase shift that corresponds to a respective phase filter;

measuring at a diffraction plane only a portion of the amplitude distribution for each of N diffraction patterns to provide measured and unmeasured portions of the amplitude distributions of the diffraction patterns, each diffraction pattern corresponding to a respective one of the phase-shifted waves;

inverse Fourier-transforming each of the measured portions of the amplitude distributions of the diffraction patterns to produce a respective computed estimate of the phase-shifted wave at the output plane, the computed estimates comprising both amplitude and phase information;

applying a respective inverse phase filter to each of the computed estimates of the phase-shifted waves to remove the phase-shift introduced by the corresponding phase filter to provide computed estimates of non-phase-shifted waves at the output plane;

correcting the computed estimates of the non-phase-shifted waves by setting the values of the amplitude and phase to zero for those portions of the computed estimates of the non-phase-shifted waves which correspond to the null region of the output plane to provide a plurality of corrected estimates; and recovering the amplitude and phase in the diffraction plane of the unmeasured portion of the amplitude distributions of the diffraction patterns based on the corrected estimates, whereby the amplitude and phase information of the unmeasured portion is recovered to achieve super-resolution.

2. The method of claim 1 wherein the unmeasured portion of the amplitude distributions is disposed internal to the region comprising the measured portions of the amplitude distributions whereby the step of recovering the amplitude and phase in the diffraction plane comprises interpolation to determine the amplitude and phase of the unmeasured portion.

3. The method of claim 1 wherein the unmeasured portion of the amplitude distributions is disposed external to the region comprising the measured portions of the amplitude distributions whereby the step of recovering the amplitude and phase in the diffraction plane comprises extrapolation to determine the amplitude and phase of the unmeasured portion.

4. A method for reconstructing a wave, comprising the steps of:

illuminating a specimen at an output plane to provide an output wave comprising specimen information, the output plane including a null region in which the output wave has a value of zero;

applying a number N of different filters to the output wave at or near the output plane to create N filtered waves each corresponding to a respective filter;

measuring at a diffraction plane only a portion of the amplitude distribution for each of N diffraction patterns to provide measured portions of the amplitude distributions of the diffraction patterns, each diffraction pattern corresponding to a respective one of the filtered waves;

inverse Fourier-transforming each of the measured portions of the amplitude distributions of the diffraction patterns to produce a respective computed estimate of the filtered wave at the output plane, the computed estimates comprising both amplitude and phase information;

applying a respective inverse filter to each of the computed estimates of the filtered waves to provide computed estimates of non-filtered waves at the output plane;

correcting the computed estimates of the non-filtered waves by setting the values of the amplitude and phase to zero for those portions of the computed estimates of the non-filtered waves which correspond to the null region of the output plane to provide a plurality of corrected estimates; and recovering the amplitude and phase in the diffraction plane of the unmeasured portion of the amplitude distributions of the diffraction patterns based on the corrected estimates, whereby the amplitude and phase information of the unmeasured portion is recovered to achieve super-resolution.

5. The method of claim 4 wherein the filters are holey filters having known spatially distributed holes.

6. The method of claim 5 wherein the holes are of varying size.

7. The method of claim 4 wherein at least some of the filters are holey filters and other filters are phase filters.

* * * * *